US007516230B2

(12) United States Patent
Sperschneider et al.

(10) Patent No.: US 7,516,230 B2
(45) Date of Patent: Apr. 7, 2009

(54) METHOD AND DEVICE FOR THE GENERATION OR DECODING OF A SCALABLE DATA STREAM WITH PROVISION FOR A BIT-STORE, ENCODER AND SCALABLE ENCODER

(75) Inventors: Ralph Sperschneider, Erlangen (DE); Bodo Teichmann, Fuerth (DE); Manfred Lutzky, Nuremberg (DE); Bernhard Grill, Lauf (DE)

(73) Assignee: Fraunhofer-Gesellschaft zur Foerderung der Angewandten Forschung e.v., Munich (DE)

(*) Notice: Subject to any disclaimer, the term of this patent is extended or adjusted under 35 U.S.C. 154(b) by 1143 days.

(21) Appl. No.: 10/466,781

(22) PCT Filed: Jan. 14, 2002

(86) PCT No.: PCT/EP02/00294

§ 371 (c)(1),
(2), (4) Date: Dec. 22, 2003

(87) PCT Pub. No.: WO02/063611

PCT Pub. Date: Aug. 15, 2002

(65) Prior Publication Data

US 2004/0162911 A1 Aug. 19, 2004

(30) Foreign Application Priority Data

Jan. 18, 2001 (DE) ................................ 101 02 159

(51) Int. Cl.
*G06F 15/16* (2006.01)

(52) U.S. Cl. ....................... 709/231; 709/247; 704/219; 704/503

(58) Field of Classification Search ................. 703/231, 703/247; 341/50, 67; 704/500; 375/354; 381/10; 709/231, 247

See application file for complete search history.

(56) References Cited

U.S. PATENT DOCUMENTS 5,365,552 A * 11/1994 Astle .......................... 375/354
5,386,213 A * 1/1995 Haupt et al. .................. 341/67

(Continued)

FOREIGN PATENT DOCUMENTS

DE 3912605 A1 10/1990

(Continued)

OTHER PUBLICATIONS

Brandenberg, Karlheinz ; Gill, Bernard, 'First Ideas on Scalable Audio Coding', Audio Engineering Society, Nov. 1994.*

(Continued)

*Primary Examiner*—Paul H. Kang
*Assistant Examiner*—Greg Bengzon
(74) *Attorney, Agent, or Firm*—Michael A. Glenn; Glenn Patent Group

(57) ABSTRACT

In a method for generating a scalable data stream, when a block of output data of a first encoder is present, this block of output data is written into the scalable data stream. If output data of a second encoder is present for a preceding period of time, this output data for the preceding section is written in transmission direction behind the block of output data of the first encoder into the data stream. When the output data of the scalable encoder for the current section is present, the output data of the second encoder is written into the bit stream subsequent to the output data of the first encoder. A determining data block is generated and written into the bit stream delayed by a period of time which corresponds to the size of the bit savings bank of the second encoder. Finally, buffer information is written into the bit stream, which indicates, where the beginning of the output data of the second encoder for the current section regarding the determining data block is, wherein the buffer information corresponds to the bit savings bank level. Thus, it is possible to simply signalize a bit savings bank in a scalable data stream. The maximum size of the bit savings bank may further be adjusted depending on the intended decoder delay and be communicated to a decoder by positioning the determining data block in the scalable data stream without an effort of additional bits in order to reduce the initial delay of the decoder.

15 Claims, 9 Drawing Sheets

U.S. PATENT DOCUMENTS

| | | | | |
|---|---|---|---|---|
| 5,579,430 | A | 11/1996 | Grill et al. | 395/2.12 |
| 5,758,092 | A * | 5/1998 | Agarwal | 709/247 |
| 5,768,537 | A | 6/1998 | Butter et al. | |
| 5,835,033 | A * | 11/1998 | Mita | 341/63 |
| 5,896,099 | A * | 4/1999 | Yamauchi | 341/50 |
| 6,092,041 | A | 7/2000 | Pan et al. | |
| 6,115,688 | A | 9/2000 | Brandenburg et al. | 704/503 |
| 6,349,284 | B1 * | 2/2002 | Park et al. | 704/500 |
| 6,369,722 | B1 * | 4/2002 | Murgia et al. | 341/50 |
| 6,487,693 | B1 * | 11/2002 | Kim et al. | 714/786 |
| 6,606,600 | B1 * | 8/2003 | Murgia et al. | 704/500 |
| 6,675,148 | B2 * | 1/2004 | Hardwick | 704/500 |
| 6,826,526 | B1 | 11/2004 | Norimatsu et al. | |
| 6,904,089 | B1 | 6/2005 | Sueyoshi et al. | |
| 7,260,225 | B2 * | 8/2007 | Teichmann et al. | 381/10 |
| 2003/0133529 | A1 * | 7/2003 | Yoo et al. | 375/354 |

FOREIGN PATENT DOCUMENTS

| | | | |
|---|---|---|---|
| EP | 0918401 | A2 | 5/1999 |
| EP | 0884850 | A2 | 12/1999 |
| JP | 2000-307661 | | 11/2000 |
| JP | 2001-0003385 | | 1/2001 |
| WO | WO97/14229 | | 4/1997 |
| WO | WO99/33274 | | 7/1999 |

OTHER PUBLICATIONS

Brandenburg et al., MPEG-4 natural audio coding, Elsevier Science B.V., Signal Processing Image Communication 15, (2000), pp. 423-444.

Balakrishnan, M., Buffer Constrainets in a Variable Packetized Video System, IEEE (1995) pp. 29-32.

Kasai, et al. A Study on Playing and Editting Processing of Video Information base on the Multimedia Scalability Package Structure. The Institute of Electronics, Information and communication Engineers. Technical Report of IEICE.

Takaaki, et al. Layered Transmission and Control of Packet Transmission Order for Multimedia Broadcasting. http://www.isoc.org/inet2000/cdproceddings/4a/4a 2.htm. Jan. 23, 2006.

* cited by examiner

METHOD AND DEVICE FOR THE GENERATION OR DECODING OF A SCALABLE DATA STREAM WITH PROVISION FOR A BIT-STORE, ENCODER AND SCALABLE ENCODER

FIELD OF THE INVENTION

The present invention relates to scalable encoders and decoders and in particular to the generation of scalable data streams.

BACKGROUND OF THE INVENTION AND PRIOR ART

Scalable encoders are shown in EP 0 846 375 B1. In general, scalability is understood as the possibility of decoding a partial section of a bit stream representing an encoded data signal, e.g. an audio signal or a video signal into a useful signal. This property is particularly desirable when e.g. a data transmission channel fails to provide the complete bandwidth necessary for transmitting a complete bit stream. On the other hand, an incomplete decoding is possible on a decoder with reduced complexity. Generally, different discrete scalability layers are defined in practice.

An example of a scalable encoder as defined in Subpart 4 (General Audio) of Part 3 (Audio) of the MPEG-4 Standard (ISO/IEC 14496-3; 1999 Subpart 4) is shown in FIG. 1. An audio signal s(t) to be encoded is fed into the scalable encoder on the input side. The scalable encoder shown in FIG. 1 contains a first encoder 12, which is an MPEG Celp encoder. The second encoder 14 is an AAC encoder, which provides high-quality audio encoding and is defined in the Standard MPEG-2 AAC (ISO/IEC 13818). The Celp encoder 12 provides a first scaling layer via an output line 16, while the AAC encoder 14 provides a second scaling layer via a second output line 18, to a bit stream multiplexer (BitMux) 20. On the output side the bit stream multiplexer then outputs an MPEG-4-LATM bit stream 22 (LATM=Low-Overhead MPEG-4 Audio Transport Multiplex). The LATM format is described in Section 6.5 of Part 3 (Audio) of the first supplement to the MPEG-4 Standard (ISO/IEC 14496-3:1999/AMD1:2000).

The scalable audio encoder further includes some further elements. First, there exists a delay stage 24 in the AAC branch and a delay stage 26 in the Celp branch. With both delay stages it is possible to set an optional delay for the respective branch. A downsampling stage 28 is downstream of the delay stage 26 of the Celp branch to adjust the sampling rate of the input signal s(t) to the sampling rate requested by the Celp encoder. An inverse Celp decoder 30 is downstream to the Celp encoder 12, wherein the Celp encoded/decoded signal is then supplied to an upsampling stage 32. The upsampled signal is then supplied to a further delay stage 34, which is termed "Core Coder Delay" in the MPEG-4 Standard.

The stage CoreCoderDelay 34 has the following function. If the delay is set to zero, the first encoder 14 and the second encoder 12 process exactly the same samples of the audio input signal in a so-called superframe. A superframe might e.g. consist of three AAC frames, which together represent a certain number of samples No. x to No. y of the audio signal. The superframe further includes e.g. 8 CELP blocks, which represent the same number of samples and also the same samples No. x to No. y if CoreCoderDelay=0.

If, however, a CoreCoderDelay D is set as a time value other than zero, the three blocks of AAC frames nevertheless represent the same samples No. x to No. y. The eight blocks of CELP frames, in contrast, represent the samples No. x−Fs D to No. y−Fs D, wherein Fs is the sampling frequency of the input signal.

The current time sections of the input signal in a superframe for the AAC blocks and the CELP blocks can thus be either identical, when CoreCoderDelay D=0, or be shifted relative to each other by CoreCoderDelay, when D is not equal to zero. For the following implementations, however, it will be assumed, on the grounds of simplicity and without restriction of generality, that CoreCoderDelay=0, so that the current time section of the input signal for the first encoder and the current time section for the second encoder are identical. In general, however, the only requirement for a superframe is, that the AAC block(s) and the CELP block(s) in a superframe represent the same number of samples, wherein it is not necessary for the samples themselves to be identical to one another, but they may also be shifted relative to each other by CoreCoderDelay.

It should be noted that the Celp encoder, depending on the configuration, may process a section of the input signal s(t) faster than the AAC encoder 14. In the AAC branch a block decision stage 26 is downstream to the optional delay stage 24 which establishes among other things whether short or long windows should be used for windowing the input signal s(t), wherein short windows must be chosen for strongly transient signals, while long windows are preferred for less transient signals since the relationship between the amount of payload data and page information is better than for short windows.

By the block decision stage 26 a fixed delay by e. g. ⅝ times a block is performed in the present example. This is referred to as a look-ahead function in the art. The block decision stage must already look ahead a certain time to be able to determine whether there are transient signals in future that must be encoded with short windows. After that the corresponding signal in the Celp branch as well as the signal in the AAC branch are fed to means for converting the time-related illustration to a spectral illustration, which is designated as MDCT 36 or 38, respectively, in FIG. 1 (MDCT=modified discrete cosine transform). The output signals of the MDCT blocks 36, 38 are then supplied to a subtracter 40.

At this point, samples belonging together regarding time must be present, i.e. the delay must be identical in both branches.

The following block 44 determines whether it is more favorable to supply the input signal itself to the AAC encoder 14. This is enabled via the bypass branch 42. If it is determined, however, that the differential signal at the output of the subtracter 40 is smaller regarding energy than the signal output by the MDCT block 38, then not the original signal but the differential signal is taken to be encoded by the AAC encoder 14 to finally form the second scaling layer 18. This comparison may be performed band by band, which is indicated by frequency-selective switching means (FSS) 44. The exact functions of the individual elements are known in the art and are described for example in the MPEG-4 standard as well as in further MPEG standards.

One main feature in the MPEG-4 standard and in other encoder standards, respectively, is that the transmission of the compressed data signal is to be performed with a constant bit rate via a channel. All high-quality audio codecs operate based on blocks, i.e. they process blocks of audio data (order 480-1024 samples) to pieces of a compressed bit stream, which are also referred to as frames. The bit stream format must here be set up so that a decoder without a priory information where a frame starts is able to recognize the beginning of a frame in order to start the output of decoded audio signal data with a lowest possible delay. Thus, each header or determining data block of a frame starts with a certain synchronization word which may be searched for in a continuous bit stream. Further common components within the data stream apart from the determining data block are the main data or “payload data” of the individual layers in which the actual compressed audio data is contained.

FIG. 4 shows a bit stream format with a fixed frame length. In this bit stream format the headers or determining data blocks are inserted equidistantly into the bit stream. The side information associated with this header and the main data follow immediately afterwards. The length, i.e. the number of bits, for the main data is the same in each frame. Such a bit stream format as it is shown in FIG. 4 is for example used in the MPEG layer 2 or the MPEG-CELP.

FIG. 5 shows another bit stream format with a fixed frame length and a backpointer. In this bit stream format the header and the side information are arranged equidistantly as in the format illustrated in FIG. 4. The start of the associated main data is, however, only performed exceptionally directly following a header. In most cases the start is in one of the preceding frames. The number of bits by which the start of the main data is shifted in the bit stream is transferred by the page information variable backpointer. The end of these main data may lie within this frame or within a preceding frame. The length of the main data is therefore not constant any more. Therefore, the number of bits with which a block is encoded may be adjusted to the characteristics of the signal. Simultaneously, a constant bit rate may be achieved, however. This technology is called “bit savings bank” and increases the theoretical delay within the transmission chain. Such a bit stream format is for example used in the MPEG layer 3 (MP3).

The technology of the bit savings bank is further described in the standard MPEG layer 3.

Generally, the bit savings bank represents a buffer of bits which may be used to provide more bits for encoding a block of time sample as is actually allowed by the constant output data rate. The technology of the bit savings bank takes into account that some blocks of audio samples may be encoded with less bits than predetermined by the constant transmission rate, so that through these blocks the bit savings bank is filled, while again other blocks of audio samples comprise psychoacoustic characteristics which do not allow such a high compression so that for these blocks the available bits would actually not be enough for a low-interference or interference-free encoding, respectively. The additional bits needed are taken from the bit savings bank so that the bit savings bank is emptied with such blocks.

Such an audio signal may, however, be also transmitted by a format with a variable frame length, as it is shown in FIG. 6. With the bit stream format “variable frame length”, as it is illustrated in FIG. 6, the fixed sequence of the bit stream elements header, page information and main data is maintained, as with the “fixed frame length”. As the length of the main data is not constant, the bit savings bank technology may also be used here, there are, however, no backpointers needed as in FIG. 5. One example for a bit stream format, as it is illustrated in FIG. 6, is the transport format ADTS (audio data transport stream), as it is defined in the standard MPEG 2 AAC.

It is to be noted that the above-mentioned encoders are no scalable encoders but include only one single audio encoder.

In MPEG 4 the combination of different encoder/decoders to a scalable encoder/decoder is provided. It is therefore possible and sensible to combine one CELP voice encoder as the first encoder with an AAC encoder for the further scaling layer(s) and pack the same into one bit stream. The purpose of this combination is that the possibility remains open either to decode all scaling layers and therefore reach a best possible audio quality, or parts of the same, maybe even only the first scaling layer, with the correspondingly restricted audio quality. Reasons for only decoding the lowest scaling layer may be that due to a bandwidth of the transmission channel which is too small, the decoder only received the first scaling layer of the bit stream. Because of this the parts of the first scaling layer in the bit stream are favored over the second and the further scaling layers in the transmission, whereby the transmission of the first scaling layer is guaranteed with capacity bottlenecks in the transmission network, while the second scaling layer may be lost completely or in part.

A further reason may be that a decoder wants to achieve a lowest possible codec delay and therefore decodes only the first scaling layer. It is to be noted that the codec delay of a Celp code is generally significantly smaller than the delay of the AAC code.

In MPEG 4 version 2 the transport format LATM is standardized, which may among other things also transmit scalable data streams.

In the following, reference is made to FIG. 2*a*. FIG. 2*a* is a schematical illustration of the samples of the input signal s(t). The input signal may be divided into different successive sections 0, 1, 2, 3, wherein each section comprises a certain fixed number of time samples. Usually, the AAC encoder 14 (FIG. 1) processes a whole section 0, 1, 2 or 3 in order to provide an encoded data signal for this section. The CELP encoder 12 (FIG. 1), however, processes usually a smaller amount of time samples per encoding step. Thus, it is shown as an example in FIG. 2*b*, that the CELP encoder or generally speaking the first encoder or encoder 1 comprises a block length which is one fourth of the block length of the second encoder. It is to be noted that this division is completely random. The block length of the first encoder may also be half as long, might, however, also be one eleventh of the block length of the second encoder. Thus, the first encoder will generate four blocks (11, 12, 13, 14) from the section of the input signal, from which the second encoder provides one block of data. In FIG. 2*c* a common LATM bit stream format is shown.

One superframe may comprise several ratios of number of AAC frames to number of CELP frames, as it is illustrated in tabular form in MPEG 4. Thus, a superframe may for example comprise one AAC block and 1 to 12 CELP blocks, 3 AAC blocks and 8 CELP blocks but also e.g. for example more AAC blocks than CELP blocks, depending on the configuration. An LATM frame which comprises an LATM determining data block includes a superframe or also several superframes.

The generation of the LATM frame opened by the header 1 is described as an example. First, the output data blocks 11, 12, 13, 14 of the Celp encoder 12 (FIG. 1) are generated and buffered. In parallel, the output data block of the AAC encoder designated with “1” in FIG. 2*c* is generated. Then, when the output data block of the AAC encoder has been generated, first of all the determining data block (header 1) is written. Depending on the convention, the output data block of the first encoder which was generated first, designated with 11 in FIG. 2*c*, may be written, i.e. transmitted, directly following header 1. Usually (regarding the few necessary signalizing information) an equidistant distance of the output data blocks of the first encoder is selected for a further writing and/or transmitting of the data stream, as it is illustrated in FIG. 2*c*. This means, that after writing and/or transmitting block 11 the second output data block 12 of the first encoder, then the third output data block 13 of the first encoder and then the fourth output data block 14 of the first encoder are written and/or transmitted in equidistant distances. The output data block 1 of the second encoder is filled into the remaining gaps during the transmission. Then, an LATM frame is fully written, i.e. fully transmitted.

One disadvantage of the bit stream formats illustrated in FIG. 4 to 6 is the fact that they are only known for simple encoders, not, however, for scalable encoders and in particular not for scalable encoders having a bit savings bank function.

As it is known, the bit savings bank is used so that the variable output data rate which a psychoacoustic encoder generates inherently may be adjusted to a constant output data rate. In other words, the number of bits an audio encoder needs depends on the signal characteristics. If the signal is comprised such that it may be quantized in relatively coarse way, then a relatively low amount of bits is needed for encoding this signal. If the signal is, however, comprised such that it has to be quantized very finely, a relatively low amount of bits is needed for encoding this signal. If the signal is, however, comprised such that it needs to be quantized very finely in order not to introduce audible interferences, then a larger amount of bits is needed for encoding this signal.

In order to achieve a constant output data rate, a medium amount of bits is determined for one section of a signal to be encoded. If the actually needed amount of bits for encoding a section is smaller than the determined number of bits, then the bits which are not needed may be placed into the bit savings bank. Thus, the bit savings bank is filled. If, however, a section of a signal to be encoded is comprised such that a larger number than the determined number of bits is needed for encoding in order not to introduce audible interferences into the signal, then the additionally needed bits may be taken from the bit savings bank. That way, the bit savings bank is emptied. Thereby it may be guaranteed that a constant output data rate is maintained and at the same time no audible interferences are introduced into the audio signal. A precondition for this is that the bit savings bank is selected to be sufficiently large.

In the standard MPEG AAC (13818-7:1997) a bit savings bank is referred to as "bit reservoir". The maximum size of the bit savings bank for channels with a constant data rate may be calculated by subtracting the average amount of bits per block from the maximum decoder input buffer size. Its value is usually firmly preset to a value of 10,240 bits according to the standard MPEG AAC with a transmission rate of 96 kBit/s for a stereo signal with a sampling rate of 48 kHz. The maximum value of the bit savings bank, i.e. the size of the bit savings bank is sized so that also under bad conditions, i.e. also when the signal comprises many sections which may not be encoded with the determined number of bits, audible interferences need to be introduced into the audio signal in order to maintain the constant output data rate. This is only possible when the bit savings bank is sized sufficiently large so that it is emptied at no time.

On the decoder side this has the following consequence. After the decoder has to consider that both the case of a full bit savings bank and the case of an empty bit savings bank may occur in the course of decoding an audio signal, the decoder needs to buffer a number of bits corresponding to the size of the bit savings bank before it starts decoding at all. Thereby it is guaranteed that the decoder does not run out of bits during decoding the audio signal. If a decoder would immediately decode a signal encoded with the bit savings bank function when it has received the same, then the bits for the output would already run out when the first block to be decoded by accident needed a smaller number than the determined number for encoding, i.e. when the bit savings bank was filled up by the first block. In other words, the bit savings bank function inevitably leads to a delay within the decoder, wherein this delay corresponds to the size of the bit savings bank.

For the preceding example the size of the bit savings bank is 10,240 bits. This leads to an inherent initial delay due to the bit savings bank of about 0.1 s. The delay gets larger, the larger the maximum size of the bit savings bank is selected and the smaller the transmission rate is selected.

If, for example, real-time transmissions of a telephone call are considered, in which a continuous change of speakers takes place, then already due to the bit savings bank a delay of the mentioned size occurs with each change of speaker. Such a delay is extraordinarily disturbing for both communication partners and typically leads to the fact that one speaker, because he does not immediately hear a reaction of the other speaker, that the one speaker repeats the question again, which contributes to a further confusion. Therefore, it is determined that a product designed this way is not suitable for real-time applications and would not have a chance of a breakthrough in the market, respectively.

SUMMARY OF THE INVENTION

It is the object of the present invention to provide an encoder comprising a bit savings bank function through which a smaller transmission delay may be achieved, to provide a method and a device for generating a scalable data stream in which a bit savings bank function may be signalized, and to provide a method and a device for decoding a scalable data stream in which a bit savings bank function is signalized.

In accordance with a first aspect of the invention, this object is achieved by a method for generating a scalable data stream from at least one block of output data of a first encoder and at least one block of output data of a second encoder, wherein the second encoder includes a bit savings bank which is defined by a maximum size and the current level, wherein the at least one block of output data of the first encoder illustrates a number of samples of the input signal in the first encoder, wherein the number of samples defines a current section of the input signal for the first encoder, and wherein the at least one block of output data of the second encoder illustrates a number of samples of the input signal in the second encoder, wherein the number of samples illustrates a current section of the input signal for the second encoder, wherein the number of samples for the first encoder and the number of samples for the second encoder are equal and wherein the current sections for the first and the second encoder are identical or shifted in relation to each other by an adjustable period of time, comprising: when a block of output data of the first encoder is present, writing the at least one block of output data of the first encoder into the scalable data stream; when output data of the second encoder for a preceding section of the input signal for the second encoder is present, writing the output data of the second encoder for the preceding section of the input signal for the second encoder in the transmission direction behind a block of output data of the first encoder; when output data of the second encoder for the current section of the second encoder is present, writing the output data of the second encoder in the transmission direction behind the output data of the second encoder for a preceding section of the input signal for the second encoder into the bit stream; generating a determining data block, when the block of output data of the second encoder for the current section of the second encoder is ready, and writing the determining data block delayed by a period of time with regard to the generation of the determining data block, wherein the period of time is smaller or equal to a delay which corresponds to the maximum size of the bit savings bank of the second encoder; and writing buffer information into the bit stream which indicates where the beginning of the output data of the second encoder for the current section of the input signal for the second encoder is with regard to the determining data block.

In accordance with a second aspect of the invention, this object is achieved by an encoder comprising a bit savings bank, wherein the bit savings bank comprises a maximum size, comprising: means for adjusting the maximum size of the bit savings bank depending on a delay provided for an audio decoder; and means for transmitting the adjusted maximum size of the bit savings bank in an output-side data stream.

In accordance with a third aspect of the invention, this object is achieved by a scalable encoder, comprising: a first encoder for generating a block of output data for the first encoder; a second encoder comprising a bit savings bank, wherein the bit savings bank comprises a maximum size for generating a block of output data for the second encoder, wherein the second encoder further comprises means for adjusting the maximum size of the bit savings bank depending on an initial delay provided for an audio decoder; a bit stream multiplexer for generating a scalable data stream, wherein the bit stream multiplexer is implemented to write the block of output data for the first encoder into a scalable data stream, write the block of output data for the second encoder into the scalable data stream; generate a determining data block after the block of output data of the second encoder has been output by the second encoder, write the determining data block into the scalable data stream delayed by a period of time, wherein the period of time corresponds the maximum size of the bit savings bank, and write buffer information into the bit stream which indicates how far the beginning of the output data of the second encoder lies before the determining data block in the transmission direction, wherein the buffer information corresponds to a current level of the bit savings bank.

In accordance with a fourth aspect of the invention, this object is achieved by a device for generating a scalable data stream from at least one block of output data of a first encoder and at least one block of output data of a second encoder, wherein the second encoder includes a bit savings bank which is defined by a maximum size and a current level, wherein the at least one block of output data of the first encoder illustrates a number of samples of the input signal into the first encoder, wherein the number of samples defines a current section of the input signal for the first encoder and wherein the at least one block of output data of the second encoder illustrates a number of samples of the input signal into the second encoder, wherein the number of samples illustrates a current section of the input signal for the second encoder, wherein the number of samples for the first encoder and the number of samples for the second encoder are equal and wherein the current sections for the first and the second encoder are identical or are shifted in relation to each other by an adjustable period of time, comprising: means for writing a block of output data of the first encoder into the scalable data stream, when a block of output data of the first encoder is present; means for writing output data of the second encoder for a preceding section of the input signal for the second encoder in transmission direction behind a block of output data of the first encoder when the output data of the second encoder for the preceding section of the input signal are present for the second encoder; means for writing output data of the second encoder for the current section of the time signal for the second encoder in transmission direction behind the output data of the second encoder for a preceding section of the input signal for the second encoder into the bit stream when the output data of the second encoder is present for the current section of the second encoder; means for generating a determining data block when the block of output data of the second encoder is present for the current section of the second encoder, and for writing the determining data block delayed by a period of time with regard to the generation of the determining data block, wherein the period of time is smaller or equal to a delay which corresponds to the maximum size of the bit savings bank of the second encoder; and means for writing buffer information into the bit stream which indicates where the beginning of the output data of the second encoder is for the current section of the second encoder with regard to the determining data block.

In accordance with a fifth aspect of the invention, this object is achieved by a method for decoding a scalable data stream from at least one block of output data of a first encoder and at least one block of output data of a second encoder, wherein the second encoder includes a bit savings bank which is defined by a maximum size and a current level, wherein the at least one block of output data of the first encoder illustrates a number of samples of the input signal into the first encoder, wherein the number of samples define a current section of the input signal for the first decoder and wherein the at least one block of output data of the second encoder illustrates a number of samples of the input signal into the second encoder, wherein the number of samples illustrates a current section of the input signal for the second encoder, wherein the number of samples for the first encoder and the number of samples for the second encoder are equal, and wherein the current sections for the first and the second encoder are identical or shifted in relation to each other by an adjustable period of time, wherein the scalable data stream comprises output data of the first encoder, output data of the second encoder for a preceding section, output data of the second encoder for the current section, a determining data block and buffer information, comprising: buffering the scalable data stream; reading the block of output data of the first encoder for the current section of the first encoder; reading the determining data block and the buffer information from the buffered data stream; determining the beginning of the block of output data of the second encoder for the current section of the second encoder using the buffer information; and decoding the block of output data of the first encoder and the block of output data of the second encoder if necessary considering the adjustable period of time by which the current section of the first encoder and the current section of the second encoder are time-shifted in relation to each other.

In accordance with a sixth aspect of the invention, this object is achieved by a device for decoding a scalable data stream from at least one block of output data of a first encoder and at least one block of output data of a second encoder, wherein the second encoder includes a bit savings bank which is defined by a maximum size and a current level, wherein the at least one block of output data of the first encoder illustrates a number of samples of the input signal into the first encoder, wherein the number of samples define a current section of the input signal for the first encoder and wherein the at least one block of output data of the second encoder illustrates a number of samples of the input signal into the second encoder, wherein the number of samples illustrate a current section of the input signal for the second encoder, wherein the number of samples for the first encoder and the number of samples for the second encoder are equal and wherein the current sections for the first and the second encoder are identical or shifted in relation to each other by an adjustable period of time, wherein the scalable data stream comprises output data of the first encoder, output data of the second encoder for a preceding section, output data of the second encoder for a current section, a determining data block and buffer information, comprising: means for buffering the scalable data stream; means for reading the block of output data of the first encoder for the current section of the first encoder; means for reading the determining data block and the buffer information from the buffered data stream; means for determining the beginning of the block of output data of the second encoder for the current section of the second encoder using the buffer information; and means for decoding the block of output data of the first encoder and the block of output data of the second encoder if necessary considering the adjustable period of time by which the current section of the first encoder and the current section of the second encoder are time-shifted to each other.

The present invention is based on the findings that the present concept of the fixed set bit savings bank size must be discarded in order to achieve a reduced-delay decoding. According to the invention, this is achieved by making the maximum size of the bit savings bank of an encoder adjustable, wherein depending on the application and depending on the intended decoder function a certain adjustment of the bit savings bank is achieved. For the case of a one-directional data transmission only a large bit savings bank may be selected in order to satisfy highest possible audio quality requirements, while for the case of a bi-directional communication in which a frequent change of transmitter and receiver and a frequent change of speakers takes place, respectively, a smaller bit savings bank size is to be adjusted. So that the decoder may profit from a smaller bit savings bank size adjustment, the bit savings bank size must be transmitted to the decoder in some way. This may on the one hand be achieved by the transmission of additional information in the data stream, it may however also be performed implicitly without the transmission of additional side information and signalizing information, respectively, as it is illustrated in particular with reference to the scalable case.

One advantage of the present invention is that now direct influence may be taken on the decoder delay via the adjustment of the maximum size of the bit savings bank. If the maximum size of the bit savings bank is selected smaller, then the decoder may also insert a smaller delay before it starts decoding without risking the danger that it may run out of output data during decoding which needs to be prevented in any case. The "price" which has to be paid for this is that one or the other section of the audio signal was not encoded with 100% of the audio quality, as the bit savings bank was empty and no additional bits were available any more. Usually, an audio encoder reacts in this case by violating the psychoacoustic masking threshold when quantizing and, in order to make do with the available number of bits, selects a coarser quantization as is really needed. The main advantage of the smaller delay of the decoder is, however, guaranteed. The reduction of the size of the bit savings bank in order to reach a smaller delay also on the decoder side is therefore achieved with a lower audio quality, wherein this lower audio quality only occurs now and then in the audio signal, and when the audio signal is simple to decode it may not occur at all. As a result, the inflexibility regarding the bit savings bank according to the prior art is overcome, which may be over-dimensioned for many applications in order to encode all possible cases with a high audio quality, so that a use of encoders for a bi-directional communication with frequently changing speakers becomes possible which was not conceivable up to now due to the large fixedly adjusted bit savings bank.

The inventive variability of the bit savings bank and the accompanying variability of the delay on the decoder side is especially of an advantage in the case of a scalable audio encoder, as now also here a reduced-delay decoding may not only be achieved of the first lowest scaling layers but also a reduced-delay decoding of higher scaling layers which are for example generated by an AAC encoder may be achieved. In particular in the scalable case only one scaling layer is influenced by the variable adjustment of the bit savings bank, while the other scaling layer(s) remain unaffected. It is thus possible to act upon individual scaling layers deliberately without causing any changes in the other scaling layers.

As it was already discussed it is necessary to communicate the freely selectable and the freely selected bit savings bank size, respectively, to the decoder. This was not necessary in the prior art, as a fixed bit savings bank size was always agreed upon, so that a decoder introduced the corresponding delay for example by dimensioning its input buffer knowing the bit savings bank size which was firmly agreed on.

In particular for scalable encoders and scalable data stream an adjustable bit savings bank size without additional side information may be achieved simply by positioning a determining data block within the scalable data stream. According to the invention, the determining data block is positioned within the bit stream so that the decoder needs to receive as many bits for the respective layer as it is determined by the average block length when it receives the determining data block.

After receiving a frame, the decoder may start decoding without calculating or inserting a delay. This is achieved due to the fact that already within the scalable data stream the determining data block is written in a delayed manner regarding the first and the second scaling layer, i.e. preferably delayed by a period of time which corresponds to the adjustment of the bit savings bank. Thereby it is achieved that the encoder may select any bit savings bank size depending on the requirement and that the selected bit savings bank size simply implicitly signalizes to the decoder, for it to enter the determining data block in the bit stream in a delayed manner with regard to the payload data.

In other words, the consequence is that the determining data block is not written at the first possible point of time anymore, i.e. delay-optimized, as in the prior art, but at the latest possible point of time, without delaying the AAC block. The current level of the bit savings bank may then be signalized by the so-called backpointer, where the data of a preceding section end and where the data of the current section begin.

This is true both for the scalable case in which only output data of one individual encoder occur in the bit stream, and also for the scalable case, in which data of at least two different encoders occur in the scalable bit stream. If a superframe, i.e. a section in the bit stream comprising a first number of output data blocks of a first encoder and a second number of output data blocks of a second encoder which relate to the same number of samples of a input signal, comprises a plurality of blocks of an encoder, then the number of blocks of the one encoder which are associated with a determining data block can simply be signalized by the fact that offset information is transferred with the bit stream. The offset information may also be interpreted by the decoder as backpointer in order to know which data of the bit stream now belong to a determining data block and therefore correspond to a time section of the input signal if necessary considering the variable core coder delay.

One main advantage of this arrangement is that the decoder, when it receives an inventive data stream, must not calculate and insert a delay, but that the delay was already considered by the positioning of the determining data block alone on the encoder side. The decoder can therefore output a frame immediately after the reception. This also provides the possibility to signalize an adjusted maximum bit savings bank size in a simple way, i.e. without additional bits. As the signalization may be performed in a simple and without efforts, i.e. by the position of the determining data block, it is also possible easily and in particular without access to the decoder to vary the bit savings bank size in order to be able to adjust the transmission delay as desired.

BRIEF DESCRIPTION OF THE DRAWINGS

In the following, preferred embodiments of the present invention are explained in more detail referring to the accompanying drawings, in which.

DETAILED DESCRIPTION OF PREFERRED EMBODIMENTS

Figure 2A:
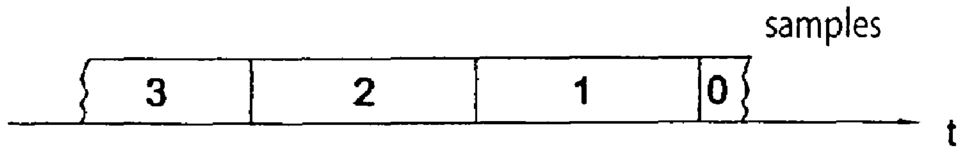
FIG. 2*a* shows a schematical illustration of an input signal which is divided into successive time sections.
Figure 2B:
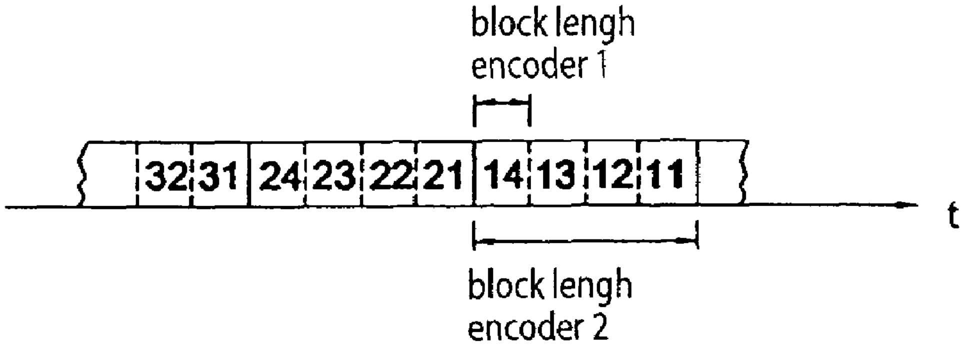
FIG. 2*b* shows a schematical illustration of an input signal which is divided into successive time sections, wherein the ratio of the block length of the first encoder to the block length of the second encoder is illustrated.
Figure 2C:
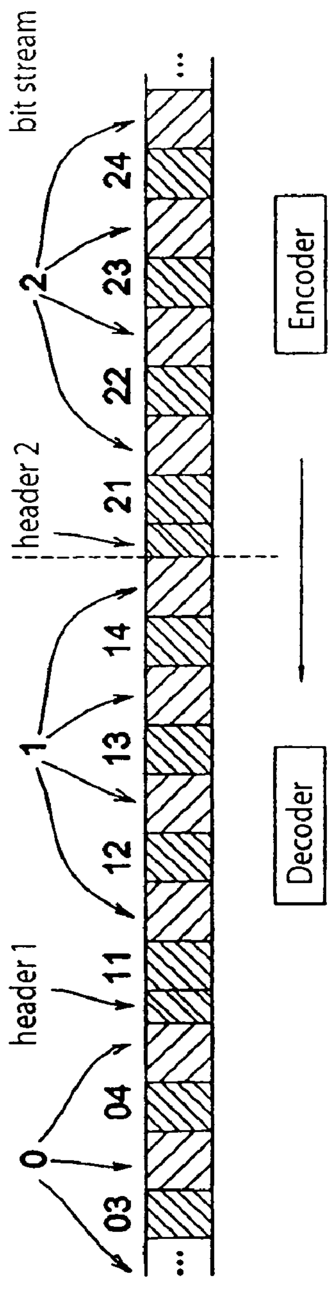
Fig. 2c (PRIOR ART)
FIG. 2*c* shows a schematical illustration of a scalable data stream with a high delay in decoding the first scaling layer.
Figure 2D:
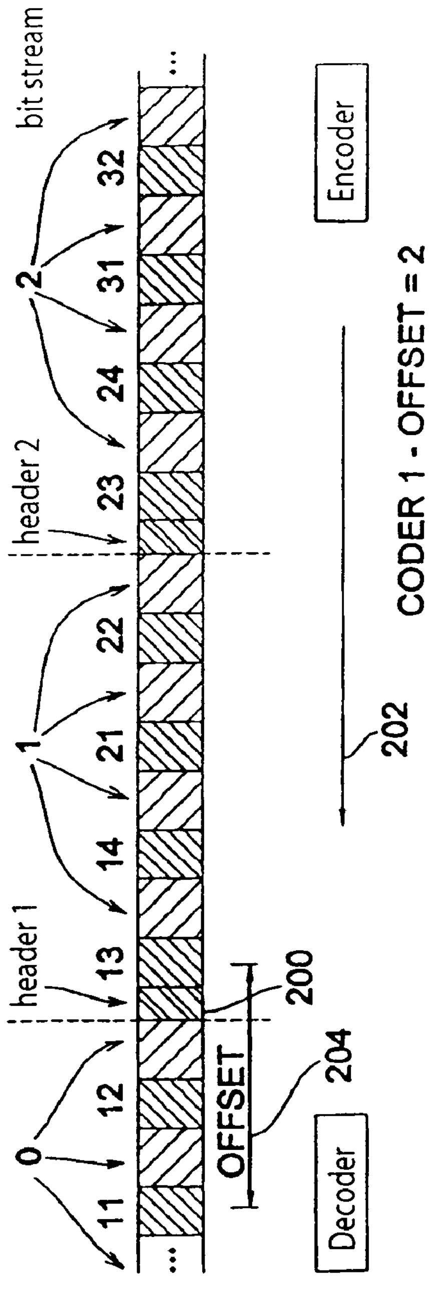
FIG. 2*d* shows a schematical illustration of a scalable data stream with a low delay in decoding the first scaling layer.

In the following, FIG. 2*d* is referred to in comparison to FIG. 2*c* in order to explain a bit stream with a small delay of the first scaling layer for purposes of comparison. As in FIG. 2*c* the scalable data stream contains successive determining data blocks which are referred to as header 1 and header 2. In the preferred embodiment of the present invention which is implemented according to the MPEG 4 standard the determining data blocks are LATM headers. Like in the prior art in the transmission direction from an encoder to a decoder, which is illustrated in FIG. 2*d* with an arrow 202, behind the LATM header 200 the parts hatched from top right to bottom left of the output data block of the AAC encoder are located which are inserted in gaps remaining between the output data blocks of the first encoder.

In contrast to the prior art, there are not only output data blocks of the first encoder within the frame started by the LATM header 200 anymore, which belong to this frame, like for example the output data blocks 13 and 14, but also the output data blocks 21 and 22 of the following section of input data. In other words, in the example illustrated in FIG. 2*d*, the two output data blocks of the first encoder, which are designated with 11 and 12, are present in the bit stream in the transmission direction (arrow 202) before the LATM header 200. In the example illustrated in FIG. 2*d* the offset information 204 indicate an offset of two output data blocks of the output data blocks of the first encoder. When FIG. 2*d* is compared to FIG. 2*c* it may be seen that the decoder may already decode the lowest scaling layer earlier by a time which exactly corresponds to this offset than it is the case in FIG. 2*c*, if the decoder is only interested in the first scaling layer. The offset information, which may for example be signalized in the form of a "core frame offset", serve to determine the position of the first output data block 11 in the bit stream.

Figure 1A:
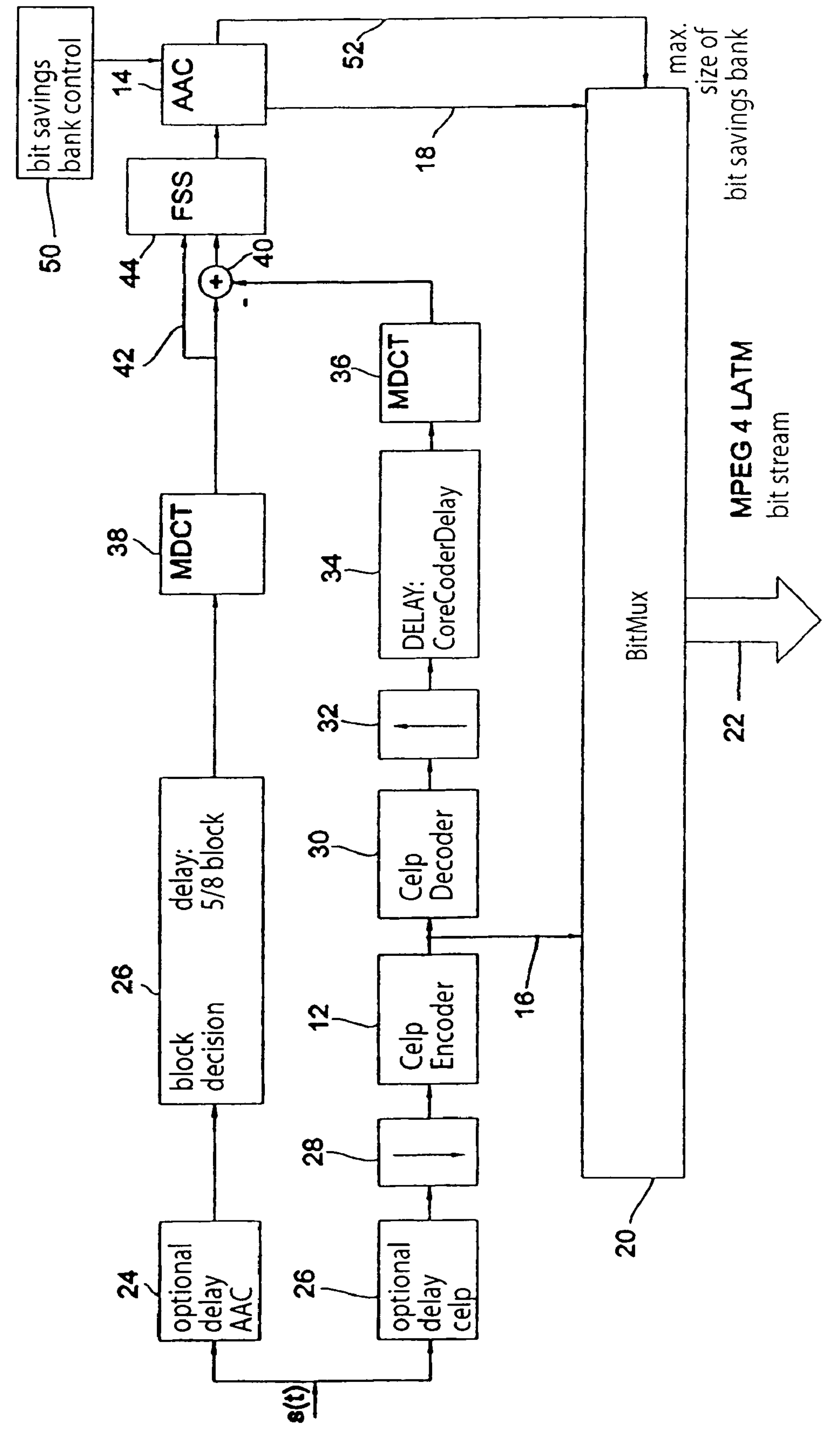
FIG. 1*a* shows a scalable encoder according to MPEG 4 which comprises the present invention.
Figure 1B:
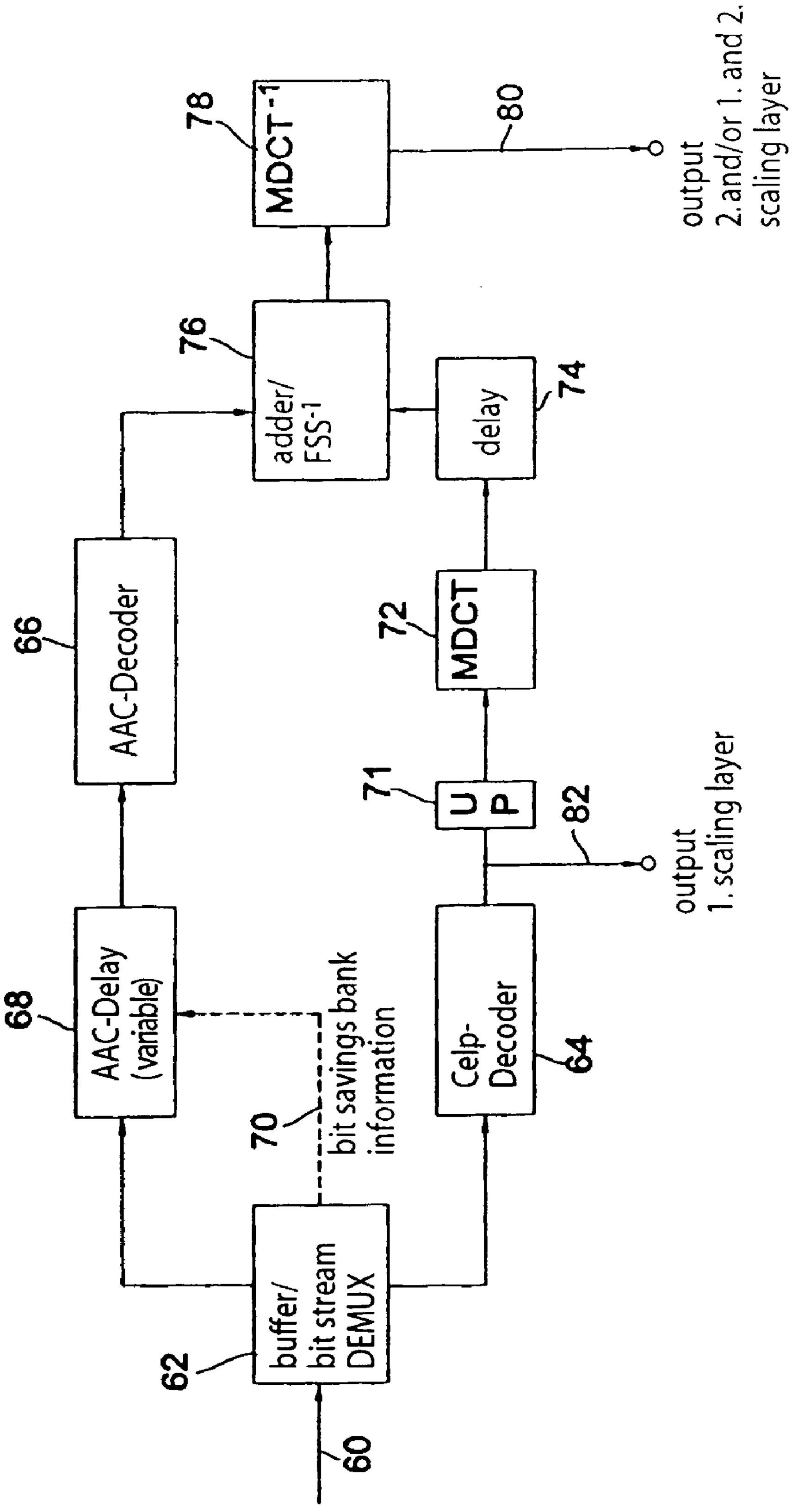
FIG. 1*b* shows a decoder according to the present invention.

For the case of core frame offset=zero, the bit stream indicated in FIG. 2*c* results. If, however, core frame offset>zero, then the corresponding output data block of the first encoder 11 is transmitted earlier by the number of core frame offset at the output data blocks of the first encoder. In other words, the delay between the first output data block of the first encoder after the LATM header and the first AAC frame results from core coder delay (FIG. 1)+core frame offset×core block length (block length of encoder 1 in FIG. 2*b*). As it becomes clear from the comparison of FIG. 2*c* and 2*d*, for the case of core frame offset=zero (FIG. 2*c*), the output data blocks 11 and 12 of the first encoder are transmitted after the LATM header 200. By the transmission of core frame offset=2 the output data blocks 13 and 14 may follow after the LATM header 200, whereby the delay with a pure CELP decoding, i.e. the decoding of the first scaling layer, is reduced by two CELP block lengths. An offset of three blocks would be optimum in the example. An offset of one or two blocks brings, however, already a delay advantage.

Through this bit stream structure it is possible for the Celp encoder to transmit the generated Celp block directly after the encoding. In this case no additional delay is added to the CELP encoder by the bit stream multiplexer (20). Thus, for this case no additional delay is added to the Celp delay by the scalable combination, so that the delay is at its minimum.

It is noted that the case illustrated in FIG. 2*d* is only exemplary. This way, different ratios of the block length of the first encoder to the block length of the second encoder are possible, which may for example vary from 1:2 to 1:12, may however also take different ratios.

In the extreme case this means (1:12 for MPEG 4 AAC/CELP), that for the same time section of the input signal for which the AAC encoder generates an output data block, the Celp encoder generates twelve output data blocks. The delay advantage by the data stream illustrated in FIG. 2*d* in contrast to the data stream illustrated in FIG. 2*c* may in this case easily take magnitudes from one fourth up to half a second. This advantage will be increased the greater the ratio between the block length of the second encoder and the block length of the first encoder becomes, wherein in the case of an AAC encoder as the second encoder a block length as great as possible is aimed at due to the ratio which is then more favorable from payload information to side information, if the encoding signal admits it.

In FIG. 2*c* a scalable data stream according to the LATM format is illustrated in which the data blocks of the first encoder have to be buffered, i.e. delayed. In the format of FIG. 2 this results from the fact, as it was discussed, that the header may only be written when the output data of the second encoder are present, as the header includes information about the length and the number of bits, respectively, within the output data block of the second encoder.

Thus, in FIG. 2*d* for purposes of illustration an improvement is already illustrated regarding the fact that the output data blocks of the first encoder are already written into the bit stream earlier in order to reduce the delay when a decoder only wants to decode the lowest scaling layer. Nevertheless, the determining data block is still located before the output data block of the second encoder, which is designated with "1" in FIG. 2*d.*

Figure 2E:
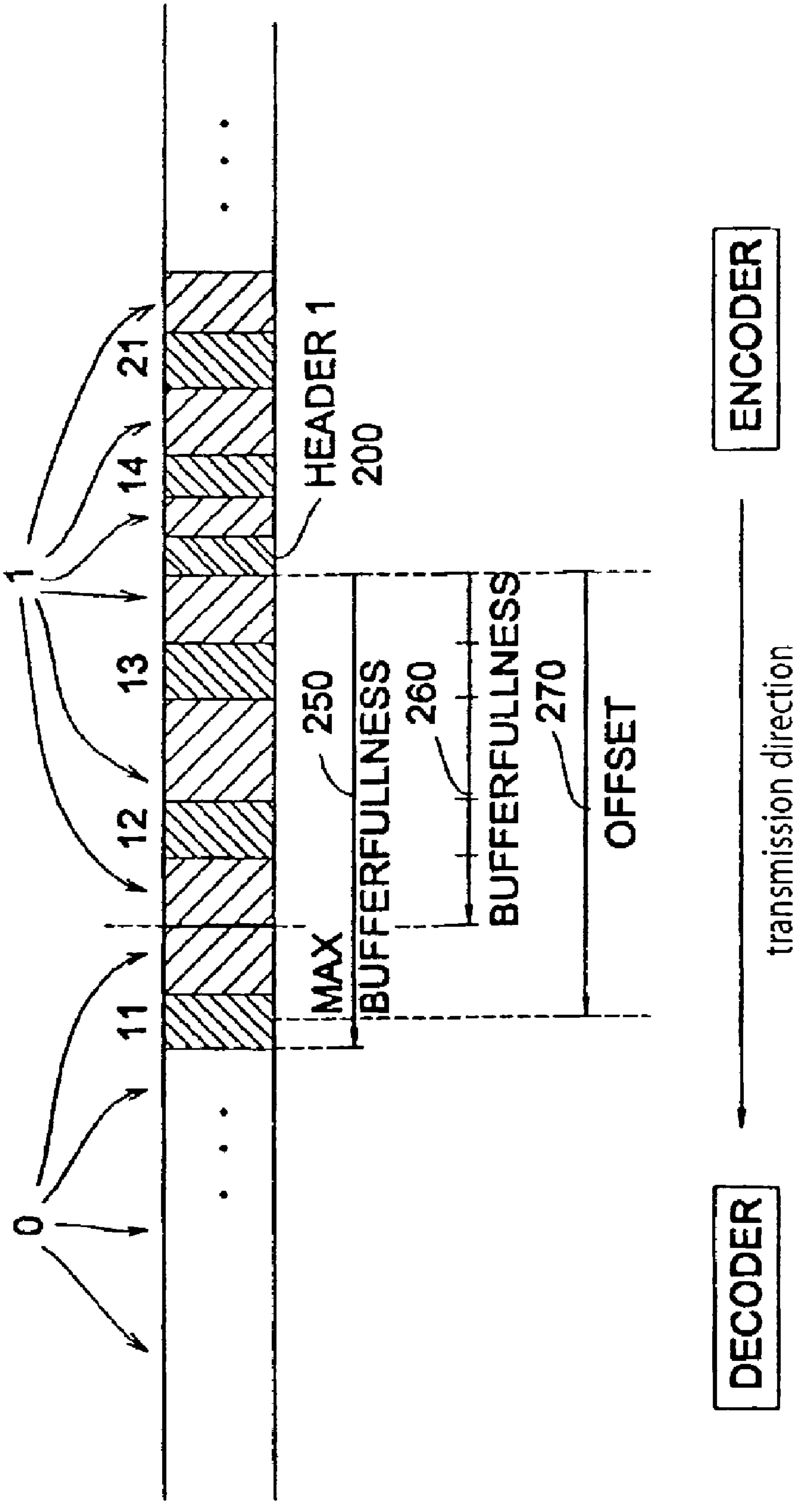
FIG. 2*e* shows a schematical illustration of an inventive scalable data stream wherein the determining data block is delayed with reference to the payload data.

In FIG. 2*e* now, compared to FIG. 2*c*, the inventive scalable data stream is illustrated, wherein the determining data block (header 1 200) is not immediately written anymore when it is available, i.e. before the output data block of the first encoder which is designated with "11", but in which the determining data block 200 is written into the data stream delayed by a period of time in relation to the case of FIG. 2*c*. This period of time equals the maximum size of the bit savings bank (max bufferfullness 250) in a preferred embodiment of the present invention. Therefore the output data block of the second encoder for the current section of the input signal, designated by the determining data block 200, starts a number of bits equal to bufferfullness 260 before the determining data block in the transmission direction from an encoder to a decoder, whereas it can be seen from FIG. 2*c* that the AAC data have started behind the determining data block.

From the point of view of the decoder the pointer 260 is therefore a backpointer.

For the case, that the first encoder provides a larger number of blocks for a number of samples than the second decoder, wherein in the example illustrated in FIG. 2*e* the ratio of four blocks of output data of the first encoder to a block of output data of the second encoder is only exemplary for the same number of samples, based on the determining data block, as in the case of FIG. 2*e*, a core frame offset is signalized, so that a decoder knows which blocks of output data of the first encoder for example belong to a block of output data of the second encoder or are related to each other via core coder delay, respectively.

If now FIG. 2*d* is compared to FIG. 2*e*, then it may be seen that also in FIG. 2*e* an offset 204 is present. The offset 204 of FIG. 2*d* which has a value of 2 in FIG. 2*d* would increase to a value of 5 with regard to the case of FIG. 2*e*, as the determining data block 200 in FIG. 2*e* compared to FIG. 2*d* has been shifted backwards by three output data blocks of the first encoder.

In the following, reference is made to FIG. 1*a* again. In addition to the scalable encoder already described in the description introduction, the inventive scalable encoder illustrated in FIG. 1*a* contains a block bit savings bank control 50 and a control line 52 from the AAC encoder 14 to the bit stream multiplexer 20, via which the maximum size of the bit savings bank which was adjusted by the bit savings bank control 50, may be communicated to the bit stream multiplexer so that the same may perform the bit stream formatting required in FIG. 2*e.*

In FIG. 1*b* a schematical block diagram of a scalable decoder may be found which is complementary to the scalable encoder in FIG. 1*a*. The scalable bit stream which is supplied to the encoder via a line 60 is fed into an input buffer/bit stream demultiplexer 62 of the decoder. Here, the bit stream is divided, to extract the required blocks for a CELP decoder 64 and an AAC decoder 66. The inventive decoder further includes an AAC delay stage 68 which serves for introducing a delay corresponding to the bit savings bank size, so that the AAC decoder 66 never runs out of data to put out. According to the invention, this AAC delay stage is now implemented variably, wherein the delay is controlled depending on the bit savings bank information, which are extracted from the bit stream by the bit stream demultiplexer 62 and supplied to the AAC delay stage 68 via a bit savings bank information line 60. Depending on the bit savings bank level now the delay of the AAC delay stage 68 is adjusted. If a small bit savings bank is adjusted by bit savings bank control means 50 of FIG. 1*a*, then also the AAC delay stage 68 may be adjusted to a small delay, so that a reduced-delay decoding of the second scaling layer may be achieved.

The scalable decoder of FIG. 1*b* further includes MDCT means 72 to transform the time domain output signals of the CELP decoder 64 into the frequency domain, and an upsampling stage upstream to the same. The spectrum is delayed by the delay stage 74, which compensates time differences present between the two branches, so that at means 76 which are referred to as adder/$FSS^{-1}$, the same ratios are present. Means 66 basically performs the analog function to the subtractor 40 and the FSS 44 of FIG. 1*a*. After block 76 the spectral values are transformed by means 78 for performing a back-transformation from the frequency domain into the time domain, so that at an output 80 either only the second scaling layer or the first and the second scaling layer are present in the time domain. At an output 82, however, only the first scaling layer is present in the time domain generated by the CELP decoder 64.

Figure 3:
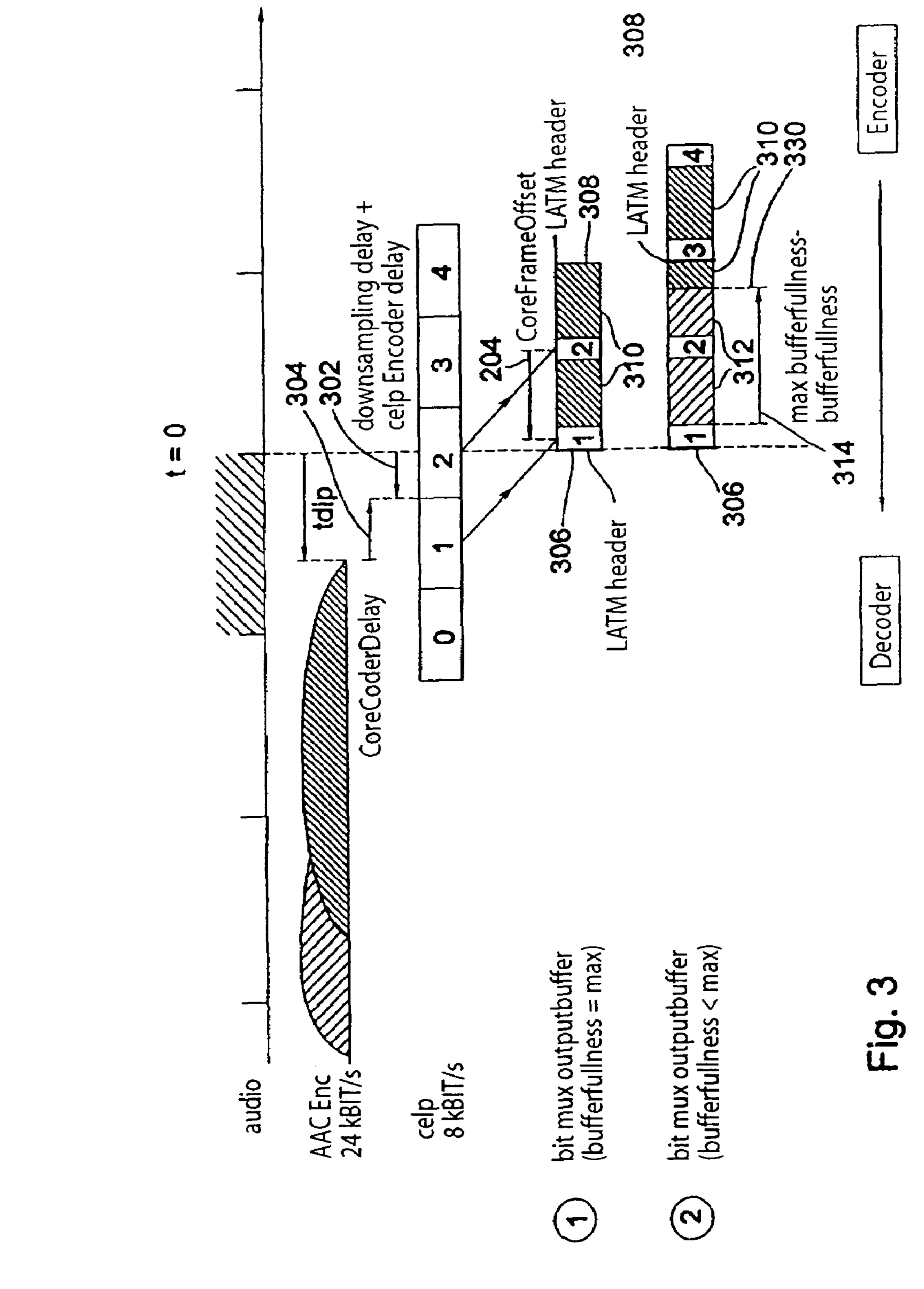
FIG. 3 shows a detailed illustration of the inventive scalable data stream regarding the example of a Celp encoder as the first encoder and an AAC encoder as the second encoder with a bit savings bank function.
Figure 4:
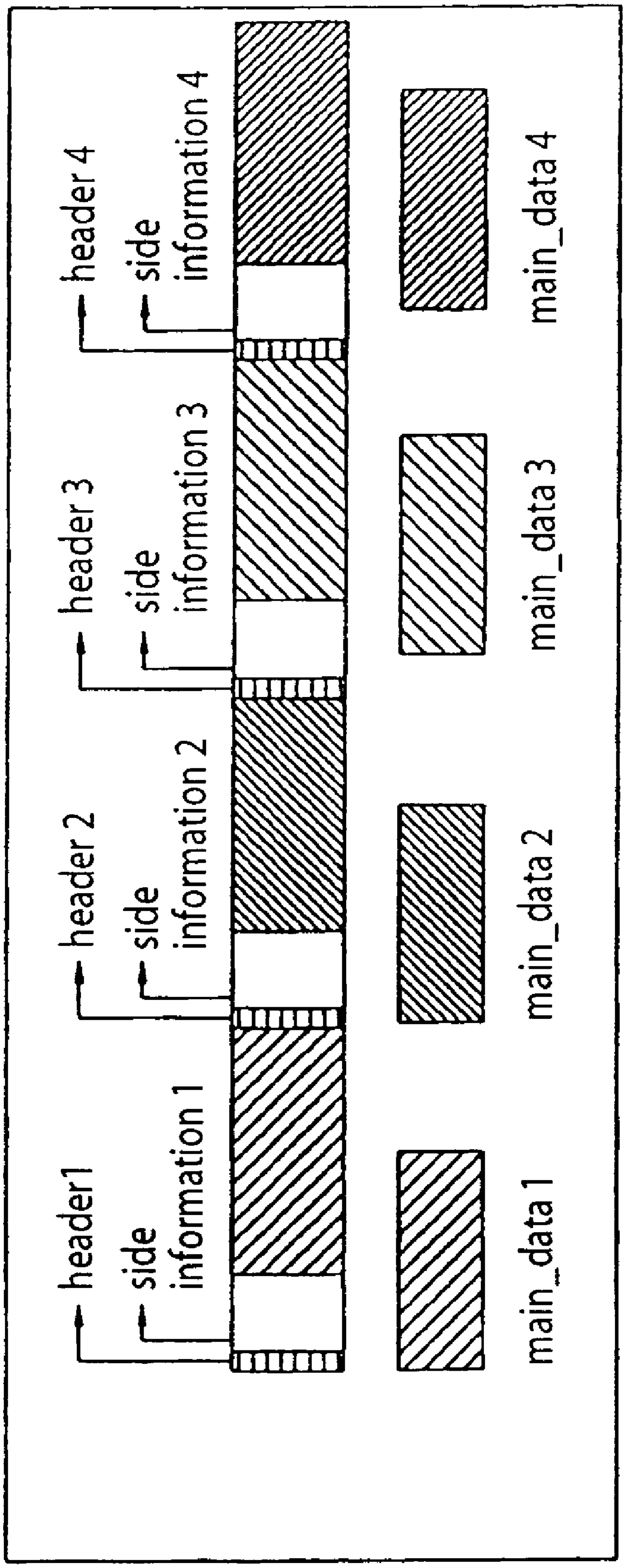
FIG. 4 shows an example for a bit stream format with a fixed frame length.

In the following, reference is made to FIG. 3, which is similar to FIG. 2, illustrates, however, the special implementation referring to the example of MPEG 4. In the first row again a current time section is shown hatched. In the second row the windowing which is used with the AAC encoder is illustrated schematically. As it is known, an overlap-and-add of 50% is used so that a window usually comprises double the length of time samples than the current time section which is illustrated hatched in the top row of FIG. 3. In FIG. 3 the delay tdip is further illustrated, which corresponds to block 26 of FIG. 1 and comprises a size of ⅝ of the block length in the selected example. Typically, a block length of the current time section of 960 samples is used so that the delay tdip of ⅝ the block length comprises 600 samples. For example, the AAC encoder provides a bit stream of 24 kbit/s, while the CELP encoder schematically illustrated below provides a bit stream comprising a rate of 8 kbit/s. The overall bit rate is then 32 kbit/s.

As it may be seen from FIG. 3, the output data blocks zero and one of the CELP encoder correspond to the current time section for the first encoder. The output data block comprising the number 2 of the CELP encoder already corresponds to the next time section. The same holds true for the CELP block with the number 3. In FIG. 3, the delay of the downsampling stage 28 and the CELP encoder 12 is further illustrated by an arrow which is designated by the reference numeral 302. From this, the delay designated by core coder delay and illustrated by an arrow 304 in FIG. 3 results as the delay which needs to be adjusted by stage 34 so that at the subtraction location 40 of FIG. 1 equal ratios are present. This delay may alternatively be generated by block 26. For example:

core coder delay=

=tdip−Celp encoder delay−downsampling delay=

=600−120−117=363 samples.

For the case without a bit savings bank function and for the case, respectively, that the bit savings bank (bit mux outputbuffer) is full, which is indicated by the variable bufferfullness=max, the case indicated in FIG. 2*d* results. In contrast to FIG. 2*d* in which four output data blocks of the first encoder are generated corresponding to one output data block of the second encoder, in FIG. 3 two output data blocks of the CELP encoder designated with "0" and "1" are generated for an output data block of the second encoder which is drawn in black in the two last rows of FIG. 3. According to the invention, now, however, not the output data block of the CELP encoder with the number "0" is written behind a first LATM header 306 anymore, but the output data block of the CELP encoder with the number "one", as the output data block with the number "zero" has already been transmitted back to the decoder. In the equidistant grid distance provided for the CELP data blocks, the CELP block 1 is then followed by the CELP block 2 for the next time section, wherein then for the completion of a frame the rest of the data of the output data block of the AAC encoder is written into the data stream until a next LATM header 308 for the next time section follows.

The present invention may simply be combined with the bit savings bank function, as it is illustrated in the last row of FIG. 3. For the case, that the variable "bufferfullness" which indicates the filling of the bit savings bank, is smaller than the maximum value, this means, that the AAC frame for the directly preceding time section needed more bits than it is actually admissible. This means, that behind the LATM header 306 the CELP frames are written as before, that however first the at least one output data block of the AAC encoder needs to be written from one or several preceding time sections in the bit stream before the writing of the output data block of the AAC encoder for the current time section may be started. From the comparison of the last two rows of FIG. 3 which are designated by "1" and "2" it may be seen that the bit savings bank function also directly leads to a delay in the encoder for the AAC frame. So the data for the AAC frame of the current time domain, which is designated by 310 in FIG. 3, is however present at the same point of time as in case "1", can however only be written into the bit stream after the AAC data 312 for the directly preceding time section have been written into the bit stream. Depending on the bit savings bank level of the AAC encoder therefore the initial position of the AAC frame is shifted. The bit savings bank level is to be transferred in the LATM element StreamMuxConfig by the variable "bufferfullness". The variable bufferfullness is calculated from the variable bit reservoir divided by the 32-fold of the actually present channel number of the audio channels.

Figure 5:
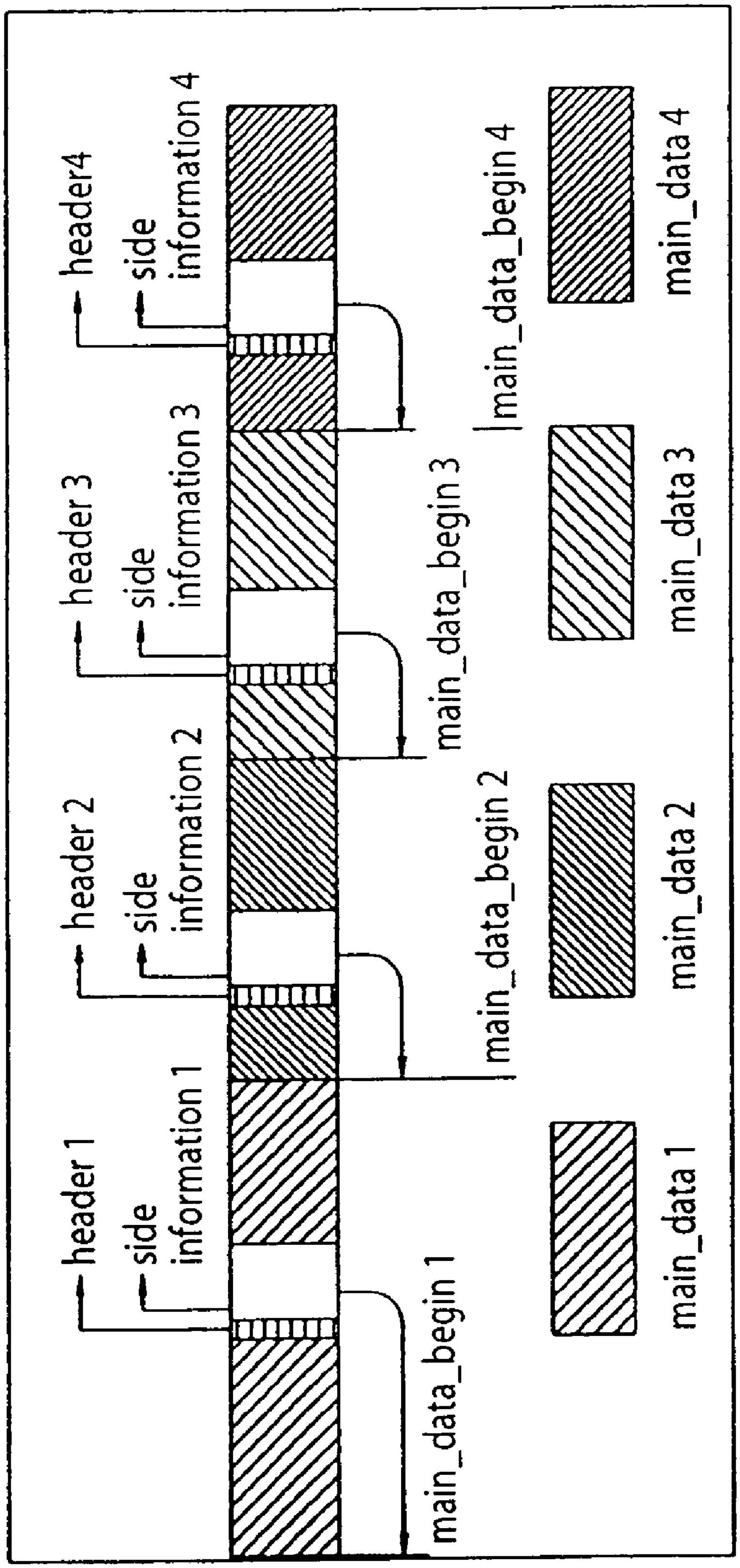
FIG. 5 shows an example for a bit stream format with a fixed frame length and a backpointer.
Figure 6:
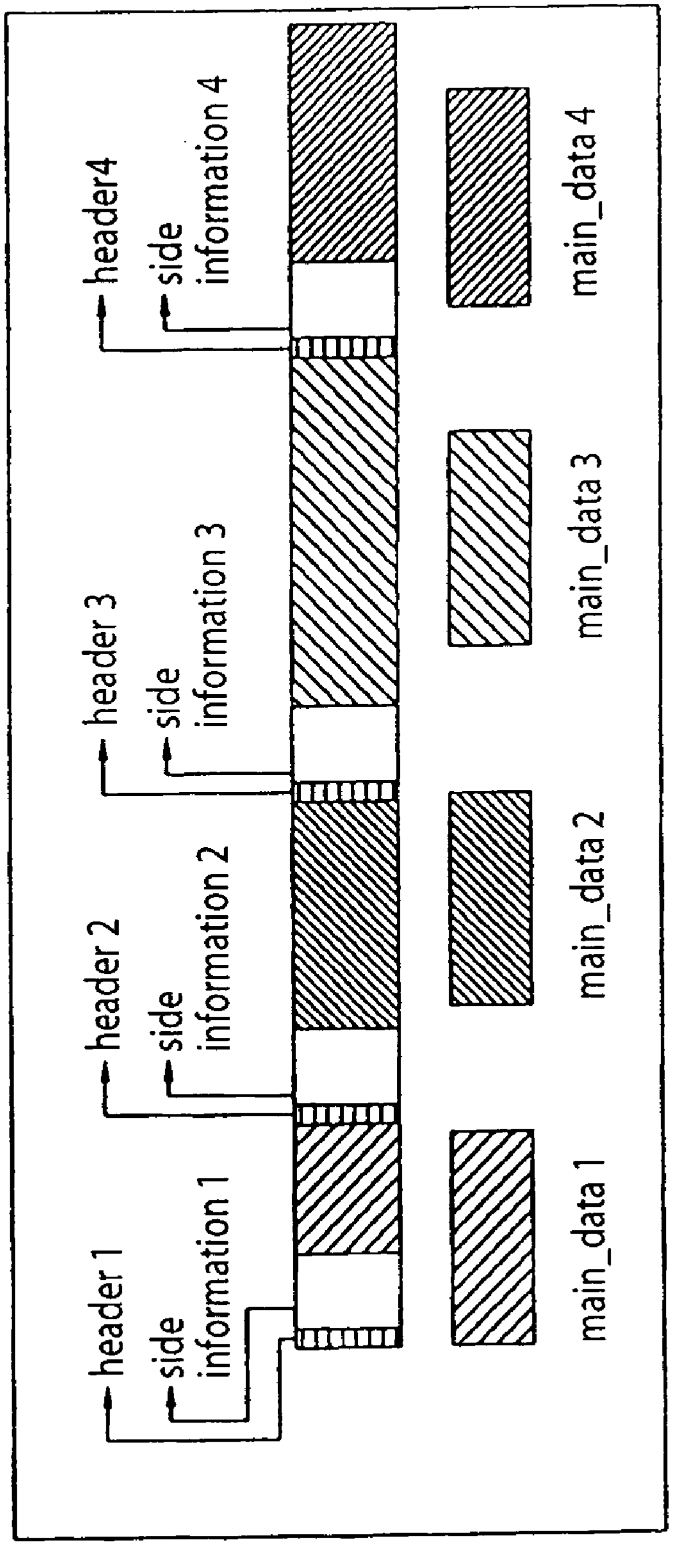
FIG. 6 shows an example of a bit stream format with a variable frame length.

It is to be noted that the pointer designated by the reference numeral 314 in FIG. 3, whose length=max bufferfullness−bufferfullness, is a forward-pointer which points to the future as it were, while the pointer illustrated in FIG. 5 is a back-pointer which points to the past as it were. The reason for this is that according to the present embodiment the LATM header is always written into the bit stream after the current time section has been processed by the AAC encoder, although AAC data may still have to be written into the bit stream from preceding time sections.

It is further noted that the pointer 314 is deliberately drawn interrupted below the Celp block 2 as it does neither consider the length of the CELP block 2 nor the length of the CELP block 1 as this data has of course nothing to do with the bit savings bank of the AAC encoder. Further, no header data and bits of possibly present further layers are considered.

In the decoder first of all an extraction of the CELP frames from the bit stream is performed which is easily possible as the same are for example arranged equidistantly and comprise a fixed length.

In the LATM header, however, length and distance of all Celp blocks may be signalized so that in every case a direct decoding is possible.

Thereby, the parts of the output data of the AAC encoder of the directly preceding time section which were so to speak separated by the CELP block 2 are jointed again and the LATM header 306 so to speak moves to the beginning of the pointer 314, so that the decoder knowing the length of the pointer 314 knows when the data of the directly preceding time section are over in order to then decode the directly preceding time section together with the Celp data blocks present for the same with full audio quality when these data is completely read in.

In contrast to the case illustrated in FIG. 2*c*, in which an LATM header is followed both by the output data blocks of the first encoder as well as the output data block of the second encoder, now on the one hand a shift from the output data blocks of the first encoder forward in the bit stream may be performed by the variable core frame offset, while by the arrow 314 (max bufferfullness−bufferfullness) a shift of the output data block of the second encoder to the back of the scalable data stream may be achieved, so that the bit savings bank function may be implemented easily and safely also in the scalable data stream, while the basic raster of the bit stream is maintained by the successive LATM determining data blocks which are always written when the AAC encoder has encoded a time section and which therefore may serve as a reference point also when a major part of the data in the frame designated by an LATM header originate on the one hand from the next time section (regarding the CELP frames) or, however, from the preceding time section (regarding the AAC frame), as it is illustrated in the last row in FIG. 3, wherein the respective shifts are communicated, however, to a decoder by two variables additionally to be transmitted in the bit stream.

For purposes of illustration the last row of FIG. 3 describes the case, as it has been discussed, in which the LATM header 306 is written into the bit stream immediately after it has been generated, so that the LATM header 306 is followed by output data of the second encoder 312 of the preceding time section, wherein the output data of the second encoder for the current time section which the LATM header 306 refers to only follow after a distance in the transmission direction behind the LATM header, wherein the distance is given by the difference between max bufferfullness and bufferfullness, as it is illustrated in FIG. 3.

In contrast to this, according to the present invention, as it is illustrated referring to FIG. 2*e*, the LATM header 306 is not written anymore when it has been generated but is written delayed by a period of time which corresponds to max bufferfullness. According to the invention, the LATM header 306 would therefore stand behind a position 330 within the bit stream depending on the value of bufferfullness and the forward-pointer 314 is replaced by a backward-pointer (260 in FIG. 2*e*).

According to the invention the arrangement selected in the FIGS. 2*c* and 2*d* and also in FIG. 3 is discarded in which a CELP block immediately follows the LATM header.

Instead of that, preferably the following priority distribution is preferred when writing data into the scalable bit stream in order to achieve a reduced-delay decoding of the first scaling layer as well as a reduced-delay decoding of the second scaling layer.

The output data blocks of the first encoder enjoy a high priority. Always when an output data block of the first encoder is completely written, this output data block is written into the bit stream. From this the equidistant raster of output data blocks of the first encoder automatically results which further have an equal length when using a CELP encoder.

If no output data of the first encoder to be written are currently present, output data of the AAC encoder for the preceding time section of the input signal is written into the bit stream until no corresponding data is present anymore. Only then the writing of the output data of the AAC encoder for the current section is started. The writing of this output data into the bit stream is obviously always interrupted when the output data of the first encoder are available again, as it may be seen in FIG. 2*e*.

The writing of the output data of the AAC encoder for the current time section is further also interrupted when an LATM header is complete and the same has been delayed by max bufferfullness 350 (FIG. 2*e*). The scalable bit stream is complete when the corresponding values for bufferfullness 260 and offset 270 have been entered into the bit stream either separately or via the determining data block.

In the following, reference is made to a decoding of a bit stream generated this way. When the decoder is only interested in the first scaling layer, i.e. the output data blocks of the first encoder (CELP encoder), then it will simply take one CELP block after the other from the bit stream and decode the same, without consideration for the LATM header or the AAC data. As the CELP blocks are preferably written into the bit stream immediately after their creation, a reduced-delay decoding of the CELP blocks is guaranteed.

When the decoder wishes a decoding both of the first as well as the second scaling layer, i.e. wants to achieve an audio signal with a high quality, then he need to achieve the association between the CELP blocks and the several AAC block(s) for a superframe, i.e. for a certain number of samples, wherein if necessary a core coder delay (34 of FIG. 1*a*) is to be considered when the current time section of the input signal of the AAC encoder regarding a superframe is shifted from the current time section of the CELP encoder.

This is performed by the decoder buffering the bit stream until it hits an LATM header, e.g. the header 200 of FIG. 2*e*. Knowing the offset 270, the decoder may then determine which output data blocks of the first encoder belong to the LATM header 200. Considering the variable bufferfullness the decoder further knows where in the data stored in the decoder input buffer the AAC frame of the time section begins that the LATM header refers to. In the case of bufferfullness equal max already the whole interesting AAC frame is contained in the decoder input buffer. In the case of bufferfullness equal 0, the interesting AAC frame begins immediately behind the LATM header, so that the decoder may begin to decode without delay using the data already stored in the input buffer or also using a part of the data stored in the input buffer and using a directly arriving part of data which stands behind the LATM header in the transmission direction. The bit savings bank size is therefore signalized only implicitly by the position of the determining data block with reference to the payload data in the bit stream, without any side information being required. In this case also the stage with a variable delay in the decoder (block 68 of FIG. 1*b*) and the line 70 of FIG. 1*b* are disposed of.

What is claimed is:

1. Method for generating a scalable data stream from at least one block of output data of a first encoder and at least one block of output data of a second encoder, wherein the second encoder includes a bit reservoir, the bit reservoir being a buffer of bits, which is defined by a maximum buffer size and a current buffer level, wherein the at least one block of output data of the first encoder represents a number of samples of the input signal in the first encoder, wherein the number of samples defines a current section of the input signal for the first encoder, and wherein the at least one block of output data of the second encoder represents a number of samples of the input signal in the second encoder, wherein the number of samples represents a current section of the input signal for the second encoder, wherein the number of samples for the first encoder and the number of samples for the second encoder are equal and wherein the current sections for the first and the second encoder are identical or shifted in relation to each other by an adjustable period of time, comprising:

when a block of output data of the first encoder for the current section is available, writing the at least one block of output data of the first encoder for the current section into the scalable data stream;

when output data of the second encoder for a preceding section of the input signal is available, writing the output data of the second encoder for the preceding section of the input signal in the transmission direction behind a block of output data of the first encoder into the scalable data stream;

when output data of the second encoder for the current section of the input signal is available, writing the output data of the second encoder for the current section in the transmission direction behind the output data of the second encoder for the preceding section of the input signal into the scalable data stream;

generating a header block, when the block of output data of the second encoder for the current section of the second encoder is complete, and writing the header block delayed by a period of time with regard to the generation of the header block into the scalable data stream, wherein the period of time is smaller or equal to a delay which corresponds to the maximum buffer size of the bit resevoir of the second encoder; and writing buffer information into the scalable data stream which indicates where the beginning of the output data of the second encoder for the current section of the input signal is with regard to the header block.

2. Method according to claim 1, wherein the period of time is equal to a delay which corresponds to the maximum buffer size of the bit resevoir, and wherein the buffer information indicates the current buffer level of the bit resevoir for the current section of the input signal for the second encoder.

3. Method according to claim 1, wherein the at least one block of output data of the second encoder for a preceding section of the input signal is written into the scalable data stream before the at least one block of output data of the second encoder for the current section is written into the scalable data stream; and wherein writing of the output data of the second encoder is interrupted, when output data of the first encoder is available, and wherein writing of the output data of the second encoder is also interrupted, when a header block is complete and has been delayed by the period of time.

4. Method according to claim 1, wherein the first encoder provides at least two blocks of output data for a current section of the input signal, wherein the method further comprises:

writing offset information into the scalable data stream, which indicates, how many blocks of output data of the first encoder in transmission direction before the header block belong to the current section of the first encoder.

5. Encoder comprising a bit reservoir, the bit reservoir being a buffer of bits, wherein the bit reservoir comprises a maximum buffer size, comprising:

an adjuster for adjusting the maximum buffer size of the bit reservoir depending on a delay caused by an audio decoder intended to receive an output data stream; and a transmitter for transmitting the adjusted maximum buffer size of the bit reservoir in the output data stream.

6. Scalable encoder, comprising:

a first encoder for generating a block of output data for the first encoder;

a second encoder comprising a bit reservoir, the bit reservoir being a buffer of bits, wherein the bit reservoir comprises a maximum buffer size, the second encoder being operative for generating a block of output data for the second encoder, wherein the second encoder further comprises an adjuster for adjusting the maximum buffer size of the bit reservoir depending on an initial delay caused by an audio decoder intended to receive an output data stream;

a bit stream multiplexer for generating a scalable data stream, wherein the bit stream multiplexer is implemented to write the block of output data for the first encoder into a scalable data stream, write the block of output data for the second encoder into the scalable data stream;

generate a header block after the block of output data of the second encoder has been output by the second encoder, write the header block into the scalable data stream delayed by a period of time, wherein the period of time corresponds the maximum buffer size of the bit reservoir, and write buffer information into the scalable data stream which indicates how far the beginning of the output data of the second encoder lies before the header block in the transmission direction, wherein the buffer information corresponds to a current buffer level of the bit reservoir.

7. Device for generating a scalable data stream from at least one block of output data of a first encoder and at least one block of output data of a second encoder, wherein the second encoder includes a bit reservoir, the bit reservoir being a buffer of bits, which is defined by a maximum buffer size and a current buffer level, wherein the at least one block of output data of the first encoder represents a number of samples of the input signal into the first encoder, wherein the number of samples defines a current section of the input signal for the first encoder and wherein the at least one block of output data of the second encoder represents a number of samples of the input signal into the second encoder, wherein the number of samples represents a current section of the input signal for the second encoder, wherein the number of samples for the first encoder and the number of samples for the second encoder are equal and wherein the current sections for the first and the second encoder are identical or are shifted in relation to each other by an adjustable period of time, comprising:

a writer for writing a block of output data of the first encoder for the current section into the scalable data stream, when a block of output data of the first encoder for the current section is available;

a writer for writing output data of the second encoder for a preceding section of the input signal in transmission direction behind a block of output data of the first encoder into the scalable data stream, when the output data of the second encoder for the preceding section of the input signal is available;

a writer for writing output data of the second encoder for the current section of the input signal in transmission direction behind the output data of the second encoder for a preceding section of the input signal into the scalable data stream, when the output data of the second encoder for the current section of the input signal is available;

a generator for generating a header block when the block of output data of the second encoder is available for the current section of the second encoder, and for writing the header block delayed by a period of time with regard to the generation of the header block into the scalable data stream, wherein the period of time is smaller or equal to a delay which corresponds to the maximum buffer size of the bit reservoir of the second encoder; and a writer for writing buffer information into the scalable data stream which indicates where the beginning of the output data of the second encoder for the current section is with regard to the header block.

8. Method for decoding a scalable data stream, the scalable data stream comprising output data of a first encoder, output data of a second encoder for a preceding section, output data of the second encoder for the current section, a determining header block and buffer information, comprising:

buffering the scalable data stream, wherein, in the scalable data stream, the header block is positioned in transmission direction behind output data of the second encoder for the current section, and in which the buffer information indicates where a beginning of the output data of the second encoder for the current section is with regard to the header block;

reading the block of output data of the first encoder for the current section of the first encoder;

reading the header block and the buffer information from the buffered data stream;

determining the beginning of the block of output data of the second encoder for the current section of the second encoder using the buffer information; and decoding the block of output data of the first encoder and the block of output data of the second encoder.

9. Device for decoding a scalable data stream, the scalable data stream comprising output data of a first encoder, output data of a second encoder for a preceding section, output data of the second encoder for a current section, a header block and buffer information, comprising:

a buffer for buffering the scalable data stream, wherein, in the scalable data stream, the header block is positioned in transmission direction behind output data of the second encoder for the current section, and in which the buffer information indicates where a beginning of the output data of the second encoder for the current section is with regard to the header block;

a reader for reading the block of output data of the first encoder for the current section of the first encoder;

a reader for reading the header block and the buffer information from the buffered data stream;

a processor for determining the beginning of the block of output data of the second encoder for the current section of the second encoder using the buffer information; and a decoder for decoding the block of output data of the first encoder and the block of output data of the second encoder.

10. Method for decoding a scalable data stream, the scalable data stream comprising output data of a first encoder, output data of a second encoder for a preceding section, output data of the second encoder for a current section, a header block and buffer information, comprising:

buffering the scalable data stream, wherein, in the scalable data stream, the header block is positioned in transmission direction behind output data of the second encoder for the current section, and in which the buffer information indicates where a beginning of the output data of the second encoder for the current section is with regard to the header block;

reading the block of output data of the first encoder for the current section of the first encoder;

reading the header block and the buffer information from the buffered data stream; and determining the beginning of the block of output data of the second encoder for the current section of the second encoder using the buffer information in order to obtain extracted blocks for a first decoder and a second decoder from the scalable data stream.

11. Device for decoding a scalable data stream, the scalable data stream comprising output data of a first encoder, output data of a second encoder for a preceding section, output data of the second encoder for a current section, a header block and buffer information, comprising:

a storage for buffering the scalable data stream, wherein, in the scalable data stream, the header block is positioned in transmission direction behind output data of the second encoder for the current section, and in which the buffer information indicates where a beginning of the output data of the second encoder for the current section is with regard to the header block;

a reader for reading the block of output data of the first encoder for the current section of the first encoder;

a reader for reading the header block; and a processor for determining the beginning of the block of output data of the second encoder for the current section of the second encoder using the buffer information in order to obtain extracted blocks for a first decoder and a second decoder from the scalable data stream.

12. Method of claim 8, wherein the second encoder includes a bit reservoir, the bit reservoir being a buffer of bits, which is defined by a maximum buffer size and a current buffer level, wherein the at least one block of output data of the first encoder represents a number of samples of the input signal into the first encoder, wherein the number of samples define a current section of the input signal for the first decoder and wherein the at least one block of output data of the second encoder represents a number of samples of the input signal into the second encoder, wherein the number of samples represents a current section of the input signal for the second encoder, wherein the number of samples for the first encoder and the number of samples for the second encoder are equal, and wherein the current sections for the first and the second encoder are identical or shifted in relation to each other by an adjustable period of time, wherein, in decoding, the adjustable period of time by which the current section of the first encoder and the current section of the second encoder are time-shifted in relation to each other is considered.

13. Device of claim 9, wherein the second encoder includes a bit reservoir, the bit reservoir being a buffer of bits, which is defined by a maximum buffer size and a current buffer level, wherein the at least one block of output data of the first encoder represents a number of samples of the input signal into the first encoder, wherein the number of samples define a current section of the input signal for the first decoder and wherein the at least one block of output data of the second encoder represents a number of samples of the input signal into the second encoder, wherein the number of samples represents a current section of the input signal for the second encoder, wherein the number of samples for the first encoder and the number of samples for the second encoder are equal, and wherein the current sections for the first and the second encoder are identical or shifted in relation to each other by an adjustable period of time, wherein the decoder is operative to consider the adjustable period of time by which the current section of the first encoder and the current section of the second encoder are time-shifted in relation to each other.

14. Method of claim 10, wherein the second encoder includes a bit reservoir, the bit reservoir being a buffer of bits, which is defined by a maximum buffer size and a current buffer level, wherein the at least one block of output data of the first encoder represents a number of samples of the input signal into the first encoder, wherein the number of samples define a current section of the input signal for the first decoder and wherein the at least one block of output data of the second encoder represents a number of samples of the input signal into the second encoder, wherein the number of samples represents a current section of the input signal for the second encoder, wherein the number of samples for the first encoder and the number of samples for the second encoder are equal, and wherein the current sections for the first and the second encoder are identical or shifted in relation to each other by an adjustable period of time.

15. Device of claim 11, wherein the second encoder includes a bit reservoir, the bit reservoir being a buffer of bits, which is defined by a maximum buffer size and a current buffer level, wherein the at least one block of output data of the first encoder represents a number of samples of the input signal into the first encoder, wherein the number of samples define a current section of the input signal for the first decoder and wherein the at least one block of output data of the second encoder represents a number of samples of the input signal into the second encoder, wherein the number of samples represents a current section of the input signal for the second encoder, wherein the number of samples for the first encoder and the number of samples for the second encoder are equal, and wherein the current sections for the first and the second encoder are identical or shifted in relation to each other by an adjustable period of time.

* * * * *